United States Patent [19]

Strobl et al.

[11] 4,032,828

[45] June 28, 1977

[54] BATTERY BACK-UP SYSTEM FOR ELECTROMAGNETS

[75] Inventors: Fred A. Strobl; Felix Di Legge, both of Chicago, Ill.

[73] Assignee: Korhumel Industries, Inc., Chicago, Ill.

[22] Filed: Apr. 12, 1976

[21] Appl. No.: 676,533

[52] U.S. Cl. .................................. 320/39; 307/66; 335/290; 361/139
[51] Int. Cl.² ...................... H02J 9/00; H01F 7/20
[58] Field of Search .......... 335/290; 317/123, 154; 307/66, 64, 65; 320/39, 32; 340/249

[56] References Cited

UNITED STATES PATENTS 3,774,050   11/1973   Littwin ........................ 317/123 X Primary Examiner—Robert J. Hickey Attorney, Agent, or Firm—Hill, Gross, Simpson, Van Santen, Steadman, Chiara & Simpson

[57] ABSTRACT

A system for supplying power to one or more electromagnets which includes a main power rectifier source and battery system including batteries charge controls and warning devices for one or more magnets such that in the event the main power source and/or the battery charger become inoperative power will be supplied to the magnets if energized at such time until the load on the magnet can be safely removed. Visual and/or audible indications are immediately given to the operator of the failure of either the main power rectifier or of the battery charger so that corrective and safety measures can be taken. A diode is provided between the battery and the load such that power flows from the battery only if the main power source voltage falls below that of the battery.

7 Claims, 5 Drawing Figures

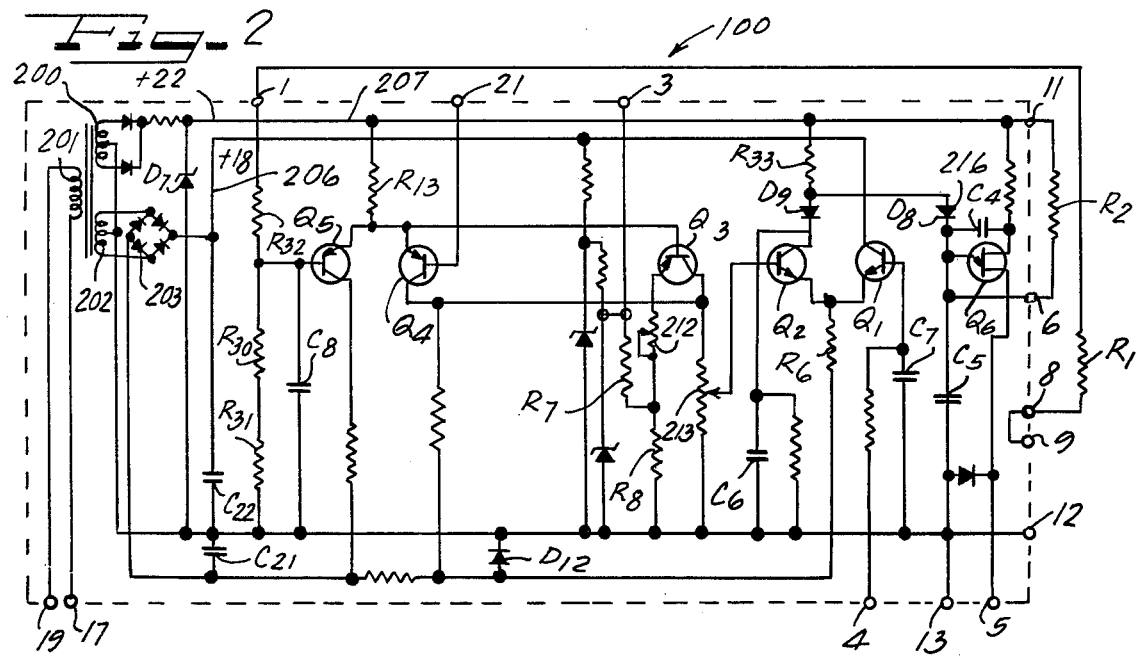
Fig-2
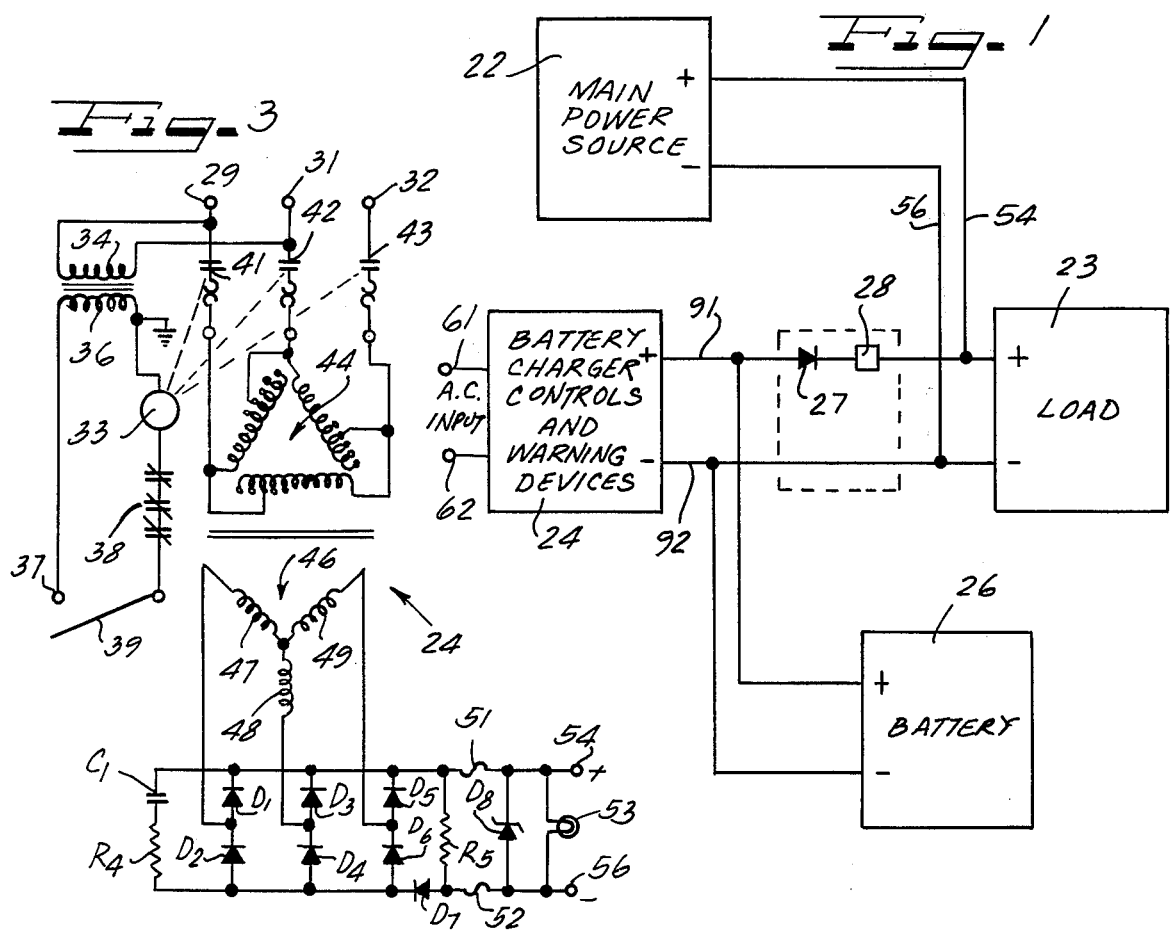
Fig-3
Fig-1

BATTERY BACK-UP SYSTEM FOR ELECTROMAGNETS

BACKGROUND OF THE INVENTION

1. Field of the Invention

This invention relates in general to electromagnets and control systems and in particular to a battery back-up system and indicating device.

2. Description of the Prior Art

Electromagnetics are utilized to lift heavy loads during which time direct current electrical power is supplied to the magnet. If during the time a load is being supported by the magnet power to the magnet fails all or a portion of the load may be dumped without warning which comprises a dangerous situation for personnel and property.

SUMMARY OF THE INVENTION

The present invention provides a main power rectifier for a control system for one or more electromagents and further includes a battery bank and charger and controls and warning devices such that in the event power from the main rectifier fails emergency power will be supplied from the battery bank to the magnetic controller and magnets.

Interlock means are provided so that if no load is being supported by the electromagnets and power is not being applied to them, the magnets cannot be energized upon failure of the main power source and/or the battery charger system and a visual or audible warning will be given to the operator of the magnets so that he realizes that there has been a power disconnect.

If when the lifting power has been applied to one or more of the magnets, power from the rectifier or battery charger fails, an indication will be immediately given to the operator and power will be applied to the magnets from the bank of batteries for a period of time which will allow safe unloading of the magnets. For example, the batteries might provide power for the magnets for a period as long as twenty minutes in a specific embodiment.

The present invention provides alternate power sources for lifting the magnets as well as provides warning and indicating devices to the operator such that even though power failures occur the magnets can be operated in a safe manner without injury to personnel or damage to property.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a block diagram illustrating the main power source, the battery charger and controls and warning devices, the battery and the load;

FIG. 2 is an electrical schematic of the charger control board;

FIG. 3 illstrates a typical main power supply;

DESCRIPTION OF THE PREFERRED EMBODIMENTS

Figure 4:
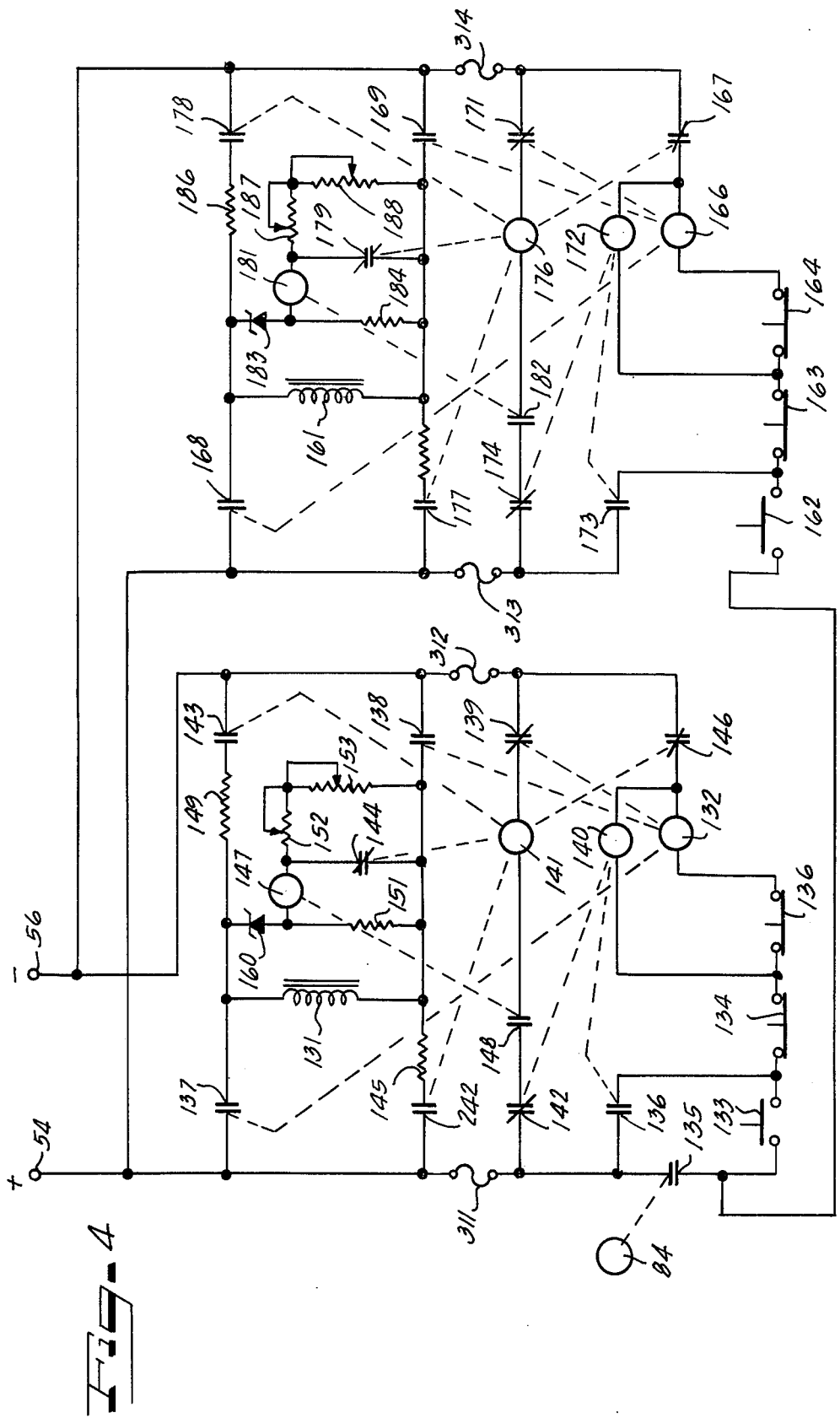
FIG. 4 illustrates a pair of electromagnets with a pair of magnet controllers.

FIG. 1 illustrates the load which might be one or more magnets and controls which are connected to a main power source 22. A battery bank 26 is connected to the load 23 through a blocking diode 27 and a current sensor 28. A battery charger and control and warning devices 24 are connected to the battery 26 and receive input AC.

FIG. 3 illustrates the main power source 22 which receives a three phase AC power on terminals 29, 31 and 32. Terminals 29 and 31 are connected to the primary 34 of a transformer which has its secondary 36 connected to one side 37 of a start switch 39. The other side of the start switch 39 is connected through contacts 38 to a relay 33 which has its other side connected to ground and the other side of secondary 36. When switch 39 is closed, relay 33 is energized to close contacts 41, 42 and 43 connected to terminals 29, 31 and 32 and the Delta connected primary 44. The secondary 46 is Wye-connected and has windings 47, 48 and 49 which are connected to rectifier comprising diodes D1 through D6 which supplies direct power to terminals 54 and 56.

A pair of magnets 131 and 161 are connected for independent or simultaneous control as illustrated in FIG. 4. Power terminal 54 is connectable through contacts 137 to one side of magnet 131 and the other side of magnet 131 is connectable through contacts 138 to termnal 56 to complete the circuit through the magnet. A lift relay 132 controls contacts 137, 138 and 139 such that when the relay 132 is energized contacts 137 and 138 are closed to energize the magnet and contact 139 opens. Terminal 54 is connected to contacts 135 of relay 84, through fuse 311, which are closed when the back-up system is operating satisfactorily and allow current to be supplied through a lift switch 133 that is momentarily closed by the operator and through normally closed drop switch 134 and normally closed fan switch 136 to the relay 132 which has its other side connected through normallly closed contacts 146 to contact 56 through fuse 312. When relay 132 is energized it closes contacts 137 and 138 to energize the magnet 132 and opens contact 139. Relay 140 is connected in parallel with relay 132 and is energized when it is energized. Relay 140 closes contacts 136 so as to connect switch 134 to contact 54 and maintain the circuit closed through relays 132 and 140. Relay 140 opens contacts 142. Contacts 142 are connected to contacts 148 and to drop relay 141. Drop relay 141 is connected to contacts 242 and 143, 144 and 146. Contacts 242 and 143 provide reverse current through the magnet 131 through dropping resistors 145 and 149. A relay 147 is connected to contacts 148 in series with a drop relay 141 and is connected across the magnet 131 in series with variable resistors 152, 153 and diode 160 with zener characteristics. A resistor 151 is connected from the diode 160 to resistor 145. Contacts 144 are connected from one end of magnet 131 to the relay 147.

Contacts 54 and 56 also supply power to the magnet 161 which has a lift switch 162 so as to energize the lift relay 166 through normally closed drop switch 163 and fan switch 164. The lift relay 166 controls contacts 168 and 169 to energize the magnet 161 and also controls contacts 171 in series with the drop relay 176. Holding relay 172 is connected to control contacts 173 and 174.

Drop relay 176 controls contacts 167, 177, 178 and 179. Relay 181 controls contacts 182 in series with the drop relay 176. Resistor 184 and diode 183 with zener characteristics are connected in parallel with the magnet 161 and variable resistors 187 and 188 are connected from relay 181 to contacts 169. Relay 181 is connected to resistor 184 and contacts 179.

Figure 5:
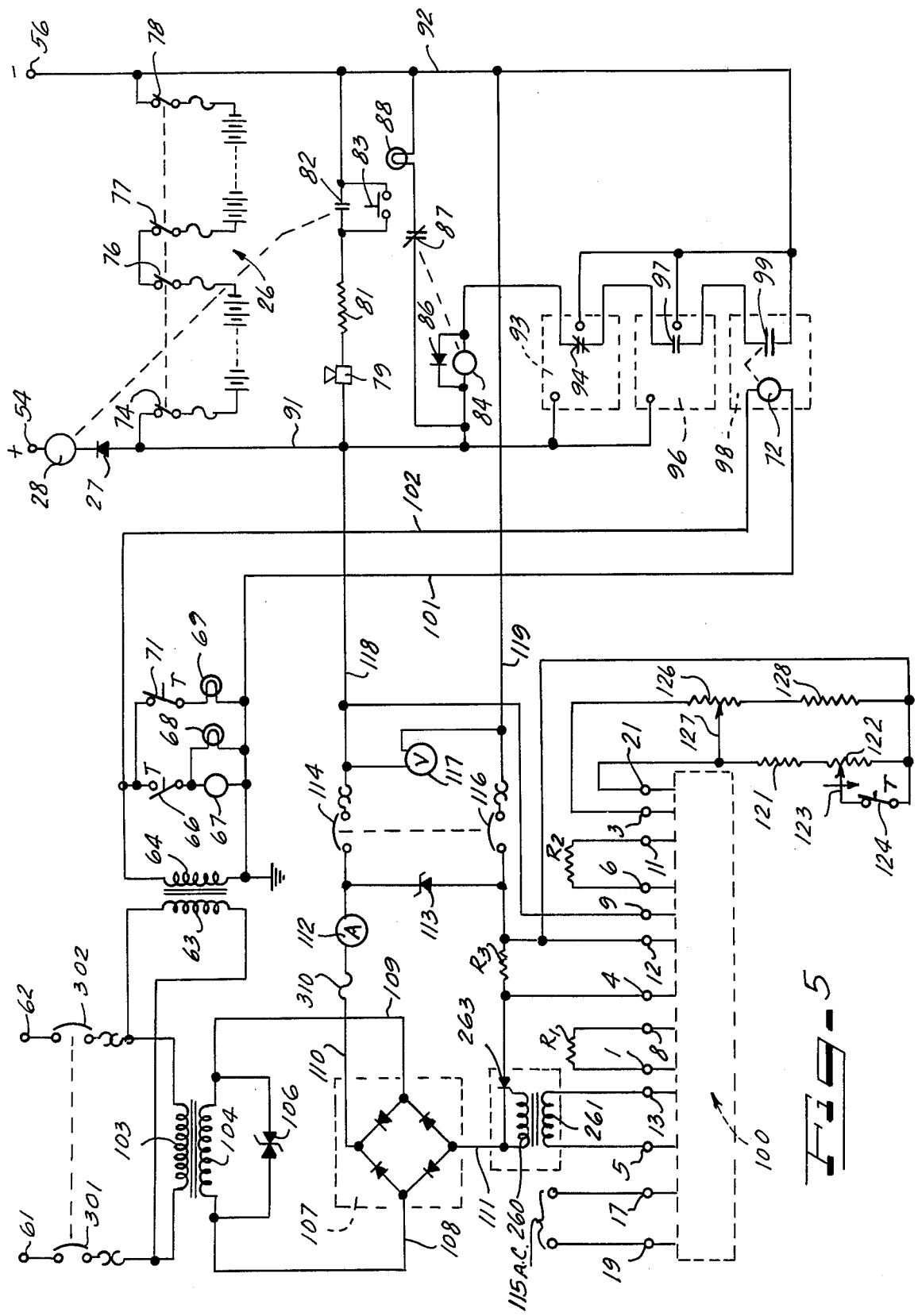
FIG. 5 illustrates the battery charger.

The battery charger and controls are illustrated in FIGS. 2 5. AC power is supplied to input terminals 61 and 62 which are connected across the primary 103 of the transformer through switches 301 and 302 which has its secondary 104 connected to a rectifier 107 through leads 108 and 109. The positive side of the rectifier 110 is connected through a fuse 310 and an ammeter 112 and switch 114 through lead 91 to switch 74 and the batteries 26. A surge suppressor 106, with characteristics of inverse parallel connected zener diodes, is connected in parallel with transformer secondary 104.

A surge suppressor 113, with zener characteristics is connected across switches 114 and 116 and connected to ammeter 112 and resistor R3.

A voltmeter 117 is connected across output of charger; connected through lead 118 to switch 74 and through lead 119 to switch 78.

Horn 79 is connected in series with resistor 81 and contacts 82 across batteries 26, connected to switch 74 and switch 78. Push button with normally open contact 82 is connected in parallel with contacts 82 to allow a test of horn.

Timer motor 67 is connected to lead 101 and timer switch 66. Equalizer lamp 68 is connected in parallel with timer motor 67. The other side of timer switch 66 is connected to lead 102. When timer is set in equalize position timer switch 66 is closed for the present time, so that timer motor 67 is energized, and then opens. When timer motor 67 is deenergized, timer switch 71 is closed, otherwise it is open. Timer switch 71 is connected to lead 102 and the other side is connected to float lamp 69. The other side of lamp 69 is connected to lead 101.

A control transformer primary 63 is connected in parallel with transformer primary 103. The secondary 64 of control transformer supplies 120 volts 10 AC to leads 101 and 102. A number of batteries may be connected in series through switches 76, 77 and 78 and the negative side of the batteries is connected to terminal 56 and lead 92. The negative side of the rectifier 107 is connected by lead 111 to one side of SCR 263 which has its other side connected through resistor R3 and switch 116 to lead 119 which is connected to a transformer winding.

The gate of SCR 263 is connected to a transformer winding 260 which has its other end connected to lead 111. The other winding of the transformer 261 is connected to input terminals 5 and 13 of the control circuit illustrated in FIG. 2.

When power is supplied to terminals 61 and 62 it is supplied to the transformer primary 63 to secondary 64 and through leads 101 and 102 to relay 98 which energizes and closes contacts 99. A high voltage relay 93 has one side connected to positive lead 91 and the other side connected to negative lead 92 and normally does not open its contacts 94 unless the voltage between leads 91 and 92 exceed a predetermined level as for example, in a particular embodiment 247 bolts. A third relay 96 has its input terminals connected to leads 91 and 92 and normally falls in at an intermediate voltage as for example, 210 volts and falls out at 202 volts and thus normally its contacts 97 are closed. Under normal conditions with the relays 96 and 98 energized and the relay 93 unenergized, power will be supplied from lead 92 to the lift interlock relay 84 which opens the warning light contacts 87 and closes the lift interlock contacts 135 illustrates in FIG. 4 so that the magnets can be energized in the lift condition.

The charger and control supply power to the leads 118 and 119 as long as the SCR 263 is gated on by the pulsing transformer 261–260 from the charger regulator board 100 shown in detail in FIG. 2. Terminals 17, 19 of the charger regulator board 100 are connected to the primary 201 of a control power transformer, the secondary 202 is connected to a rectifier 203 and supplied a positive voltage as for example, plus 18 volts on lead 206. A secondary 200 supplies a positive voltage as for example, plus 22 volts on lead 207. The resistor R3 in FIG. 5 is a current sensing resistor and is connected to terminals 4 and 12 in FIG. 2. The SCR 263 is gated by the pulses on the winding 261 connected to terminals 5 and 13 of the charger regulator 100. The terminal 13 is connected to a capacitor C5 which is connected to the resistor R33 through the diode D8 and to the gate of the unijunction transistor Q6, and the terminal 5 is connected to the base 1 terminal of the unijunction transistor Q6. The transistor Q1 and Q2 comprise a differential amplifier for sensing current through thr current sensing resistor R33 and supplied an output to the unijunction transistor Q6. The differential amplifier comprising the transistors Q4 and Q5 sense the voltage and supply output through transistor Q3 which has a current limiting slope adjusting resistor 121 and a current limit adjusting resistor 213.

The SCR 263 allows the output of the charger to be varied from 0 to maximum by the use of a very low power phase-variable source of gating pulses. Such puslses are supplied by the charger regulator circuit 100.

The differential amplifier comprising the transistors Q4, Q5 provide close voltage regulation at full float or equalized charge level. The differential amplifier comprising transistors Q1, Q2 limits current when the connected load exceeds the charger output current rating. Current droop below about 50% of rated voltage for short-circuited and deep-discharge protection is controlled by transistor Q3 and a minimum output to start recharge of a completely dead battery is ensured by resistor R2. The unijunction transistor Q6 provides a relaxation oscillator which works like a voltage-sensitive switch between the emitter and base 1 and is essentially like a fixed resistor between base 1 and base 2. When the capacitor C5 is discharged, Q6 will be cut off as the capactitor C5 starts to charge the Resistor R33 and diode 216. The unijunction transistor remains cut off until the emitter voltage rises to a critical percentage of the interbase voltage, about 50%. Then the unijunction transistor switches on and the resistance between the emitter and base 1 drops to a very low value, allowing the capacitor C5 to discharge rapidly through the primary of pulse transformer 261. The pulse induced in the secondary 260 then fires the SCR 263 allowing power to be supplied to line 92.

The unijunction transistor can be fired not only by increasing emitter voltage, but also by lowering interbase voltage (to about twice whatever voltage happens to appear at the emitter). This is just what is done to synchronize the oscillator with the AC line. Note that the power supply for 6 is full-waved rectified, but completely unfiltered (the only capacitors connected to that source are C5 and C6, and they are blocked from filtering action by diodes D8 and D9, respectively). This supply is also clipped and regulated by Zener diode D7, so that for most of each half cycle the voltage is +22. But at the end of each half cycle, the supply voltage drops to zero before quickly rising to +22 again at the beginning of the next half cycle. During this brief collapse of supply voltage, the unijunction transistor interbase voltage drops to zero, so that regardless of what the emitter voltage may be, Q6 turns on and discharges capacitor C5 through 261. The resulting puse amplitude may or may not be great enough to trigger the SCR; if so, the firing occurs so late in the half cycle that SCR output is negligible anyway. What is important about this event is that C5 is discharged, and thus starts each new half cycle in the same, predictable condition.

With the unijunction transistor trigger circuit being reset at the beginning of each half cycle as described above, the degree of phase shift in Q6 pulse output depends entirely on how long it takes C5 to charge to the critical emitter voltage. In normal operations, C5 draws most of its charging current through D8 and R33. The diode ensures that C5 will discharge only through Q6. Note that R33 not only is the C5 charging path, but also in the collector circuit for Q2. If Q2 is drawing little current, C5 charges rapidly, firing Q6 early in the half cycle; SCR output is then high. As Q2 conduction increases, less current is available to CR through R33; C5 voltage rises more slowly, Q6 fires later in the half cycle, and SCR output is reduced.

The degree of which Q6 firing can be delayed by increasing Q2 current as limited by R2, which provides an alternative path for C5 charging current. This is essential to permit the delivery of some current to a completely discharged battery. The voltage across a dead battery would initially be zero, and the regulator, sensing this, would drive Q2 to maximum condition. Without R2, C5 would not reach the Q6 trigger voltage, and Q6 would fire only during interbase voltage collapse at the end of the half cycles; SCR output would be zero, and the dead battery could not be charged. In addition to being impractical, such an arrangement could also endanger the SCR. By making C5 reach the Q6 trigger voltage well before the end of each half cycle, regardless of Q2 condition, R2 ensures that only a reduced amplitude synchronizing pulse can occur near the end of a half cycle.

The charger's output varies so that output voltage drops (because of a severe load demand such as a short circuit, current tapers off under the influence of Q3, which causes Q2 current to increase as output voltage drops from the 50% level toward zero. At a point Q2 current becomes so high that R2, bypassing R33, becomes the effective C5 charging path. The Q2 current continues to increase as output voltage drops still lower, but this has no further effect on output current. The value of R2 thus determines the fixed minimum percentage of rated circuit that the charger will deliver into even a direct short circuit. As explained above, such a minimum output, not under control of voltage and current sensing circuits, is required to enable the charger to start recharging a completely dead lead-calcium battery, for example, which would initially look like a shorted bus to sensing circuits.

As explained above, the degree of phase shift in SCR trigger pulses, except for minimum current controlled by R2, depends on the value of Q2 collector current, which determines how much charging current is available to C5 through R33. Since phase shift must provide both voltage regulation and current limiting, Q2 current must increase (to delay Q6 firing and decrease SCR output) as output, either voltage or current, rises past the desired value. Conversely, Q2 current must decrease if output voltage drops below the desired value, but must not decrease enough to raise output current above its rated maximum.

To accomplish these actions, Q2 is paired with Q1 (through shared emitter resistor R6) to form a differential amplifier that compares a voltage-error signal at the base of Q2 with a voltage derived from output current at the Q1 base.

The input to Q1 is the voltage developed across current sensing resistor R3, which ranges from zero (at zero output current) to $-0.5$ V. (at full rated charge current). The Q2 input, determined by the response of the Q4-Q5 and Q3 stages to DC system voltage, covers the same zero of $-0.5$ V. range, but not with the same linear relationship to bus voltage that Q1 input bears to output current. The Q2 base, at zero when bus voltage is at the regulator's set point, goes steeply negative as system voltage drops. It quickly reaches the $-0.5$ V. limit and stays there until voltage drops about 50% of rated value. It then moves back toward zero along a much more gradual slope as voltage continues to drop.

Parameters of the Q1-Q2 circuit are such that the output voltage changes, predominate in control Q2 current until charger output current approaches the rated maximum level. Any further increase in the negative Q1 base voltage due to load current then pushed Q1 into the cutoff region, substantially increasing Q2 current. In effect, Q1 seizes control of Q2 at the current limit point. This point is determined by the setting of R213 which adjust for variations in circuit components to make Q1 cutoff occur at the $-0.5$ V. Base voltage across R3 is full rated output current.

An increase in charger output voltage also increases Q2 collector current, but here the action of Q2 is the last in a series that starts with Q4 and Q5. These transistors also form a differential amplifier, but in this case the function is to develop output changes in Q4 collector current proportional to any difference between actual charger output voltage and desired output voltage.

The Q5 base receives an input that varies directly with charger output voltage. The value of R1 is chosen so that the voltage divider consisting or R30, R31, R32, and R1 puts the Q5 base at +6.5 V. when charger output is at the nominal float charge voltage. The Q4 input, on the other hand, can be only two discrete voltages, the reference levels for the float and equalize charge voltages to be maintained by the regulator. Reference levels are determined with use of resistors 126, 128, 121, 122 and timer switch 124. Variable resistor 126 has one end connected to charger regulator board input 3. The other end is connected to fixed resistor 128 whose other end if connected to R3 and charger regulator board input 12. This end of resistor 128 is also connected to one side of timer switch 124 and one end of variable resistor 122. The slider connection 123 of resistor 122 is connected to the other end of timer switch 124. The other end of variable resistor 122 is connected to one end of fixed resistor 121. The other end of fixed resistor 121 is connected to the slider connection 127 of variable resistor 126 and to charger regulator board input 21. When the timer motor 67 is energized in equalize position timer contacts 124 are open until preset time elaspes and they close. The collector ouput of Q4, then, with its precisely fixed base voltage, depends on the effect Q5 operation has on current through shared emitter resistor R13. A change in Q5 is collector current causes an opposite change in Q4 current. When the charger is at full float voltage and no charging current is called for, Q5 is cut off and Q4 is conducting maximum collector current. At times Q3, is cut off and has no effect on operation. Consequently, full Q4 conduction also drives Q2 to full conduction, for maximum retardation of SCR firing. Any drop in system voltage increases Q5 current, thus decreasing and eventually cutting off Q4 current. Such a decreasing Q4 collector current appears as a negative-going input to Q2. As already established, this decreases Q2 current to speed C5 charging and increase SCR output (unless the timing value of output current has been reached so that Q1 is controlling the Q1–Q2 pair).

When the equalize timer is turned on to switch the charger's output from float to equalize charge voltage, the opening of the timer's normally closed contacts 124 inserts full resistance of resistor 122 in the Q4 base circuit, increasing Q4 base voltage. This decreased Q4 current just a drop in charger output voltage would, and SCR output increases accordingly to obtain balance of Q4 and Q5 at the new reference level.

Circuit parameters in the Q4–Q5 pair are such that a very small change in Q5 base voltage causes a large change at the Q4 collector. To obtain the very close voltage regulation characteristic of SR chargers, gain is increased still further by a small positive feedback signal obtained from current sensing resistor R3.

Charger output voltage will drop substantially only in the presence of such severe demands as a short circuit on the DC bus or a drastically discharged battery. In either case, to continue delivering full rated current would be to risk overheating the SCR for no useful purpose. Accordingly, under such conditions the regulator makes current taper off to the minimum established by R2. This is accomplished by Q3, in conjunction with Q4 and Q5.

If charger output voltage drops, the Q4-Q5 pair goes so far out of balance that Q4 shuts off and Q5 becomes in effect a single emitter follower. As the Q5 emitter (and with it, the Q3 base) goes negative with the dropping Q5 base voltage, the Q3 emitter-base junction becomes forward biased, and Q3 collector current begins to flow through R213. As this Q3 current increases with further lowering of DC bus voltage, the Q2 base voltage tapped from R213 goes toward zero from its maximum negative value at Q4 cutoff, and Q2 current increases to delay C5 charging and reduce SCR output.

The point at which Q3 starts to conduct and cut back output current is determined by the values of R7 and R8, which put it at about 50% of nominal float charge voltage. This is substantially below the voltage at which a battery would be discharged in a normal duty cycle. There is thus no question of Q3's interfering with normal operation.

Capacitors C21 and C22 are filter capacitors for the negative and positive DC power supplies, respectively.

Capacitor C4 suppresses transients which might reach the Q6 circuit from the AC line. Its purpose is to help prevent SCR firing which might other wise result from transient dips in Q6 interbase voltage.

Capacitor C6 protects the SCR during charger startup. During the firt few cycles of operation, while the regulator circuits are coming to their operating conditions, C6 draws charging current through R33. This ensures that C5 will not be able to fire the Q6 circuit and trigger the SCR until all regulator circuits are ready to exercise control.

Capacitors C7 and C8 are filters that smooth out the pulsating DC from the charger output voltage and current sensing lines and provide relatively slowly changing, averaged DC voltages as inputs to the two differential amplifiers.

In operation, the switch 39 is closes so as to close contacts 41, 42, and 43 by energizing the relay 33 and DC power is supplied to terminals 54 and 56.

The lift interlock relay 84 will be enegizied so as to open contacts 87 and close contacts 135 because of the conditions of relays 93, 96 and 98. The magnet 131 can be energized by closing the lift button switch 133 which will energize relays 132 and 140. Relay 132 will close contacts 137 and 138 thus energizing the magnet 131 so it can be used for lifting.

When it is desired to drop the load carried by the magnet the drop switche 134 is opened thus de-engerizing relays 132 and 140 which allows contacts 142 and 139 to be closed. Relay 147 is energized closing contacts 148 so that power will be supplied to the drop relay 141 which closes contacts 242 and 143 thus allowing power in the reverse direction to be supplied to the magnet 131. The load carried on the magnet will be released. Magnet 161 may be operated similarly, via its controller simultaneously or separately.

As long as power to the magnets is being supplied by the main power source 22, when the lift mode and the lift interlock relay 84 is energized operation can continue. If, for any reason, the main power source should fail at a time when the magnet is energized power will be supplied from the battery 26 to maintain the magnet in the energized condition. However, the relay 28 will close the contacts 82 thus energizing the audible warning device 79 so that the operator's is immediately warned of the failure of the main power supply. However, since the batteries have sufficient power to maintain the magnet energized for a period of time as for example 20 minutes, the load on the magnet can be safely removed after it has been placed in a safe unload position. After the magnet has been unloaded, the failure in the main power supply would be corrected before further lifting would occur.

The lift prevent interlock relay 84 also presents a visible warning by illuminating the light 88 if it is de-energizied by either the relay 98 being de-energized which means that 120 volts is not present on leads 101 and 102 or if the relay 96 falls out because the voltage has fallen below a level as for example 202 volts or if the high voltage relay 93 falls in because the voltage has gone above 247.5 volts. Under any of these three conditions, the lift interlock relay 84 is de-energized and contacts 87 are closed to illuminate warning light 88.

Under normal conditions the battery charger and control will maintain the batteries in the full charged condition and the magnets will operate on the main power source. The current sensing relay 28 senses failure of the main power source through discharge of the batteries to the magnets and immediately energizes the auidible warning 79 which might be a siren.

In the invention, the following conditions must be maintained:

1. MAIN POWER SOURCE
   1. DC voltage must be higher than battery voltage.
   2. Ripple ≤ 5%
      A. 3φ bridge rectifier unfiltered
      B. 1φ bridge rectifier filter to 5% ripple
      C. Generator (MG set)
      D. Battery W. Charger
2. CHARGER
   1. Voltage limited
   2. Regulated
   3. Warning devices and controls per user request
      a. Typically sense high or low batt voltage turns on a light in either case.
      b. Senses a power failure to charger — Turns on a light
      c. Current sensor detect battery discharge turns on horn.
   Provisions to test Power failure to charger, and, current draw sensor contacts energizing horn.

---

3. LOAD
   1. Anything which will operate at the lower battery voltage when power fails, and operate from the typical main power sources listed as examples.

Warning on if Relay 84 Off

| Relay 84 on | 93 (HDC) Below Fall in) <br> 96 (LDC) Above Fall in) <br> 98 (PFR) energized) | Condition Safe |
|---|---|---|
| Relay 84 Off | A. 93 (HDC) below fall in) <br> 96 (LDC) above fall in) <br> 98 (PFR) de-energized) | Unsafe |
|  | B. 93 (HDC) above fall in) <br> 96 (LDC) above fall in) <br> 98 (PFR) energized) | Unsafe |
|  | C. 93 (HDC) below fall in) <br> 96 (LDC) below fall out) <br> (if it fell in)) <br> 98 (PFR) energized) <br> Warning energized | Unsafe |

---

It is to be relized that the diode 27 between the battery 26 and load 23 has a polarity such that power will not flow from the battery to the load unless the voltage on lead 54 goes below that on lead 91. Thus, power is always supplied from the main power source 22 unless its voltage falls to a level below that of the battery 26.

Although it has been described with respect to preferred embodiments, it is not to be so limited, as changes and modifications may be made which are within the full intended scope as defined by the appended claims.

We claim as our invention:

1. A battery back-up system for an electric magnet comprising:
   a main power source connected to said magnet through a magnet controller,
   a battery means,
   a unilateral current means connected between said battery means and said magnet such that if the voltage from said main power source drops below the battery voltage power will be supplied from said battery to said magnet,
   including a battery charger and controls connected to said battery, and including a current sensing means connected between said battery and said magnet and a first warning device connected to said current sensing means to give a warning when current is supplied to said magnet from said battery, and means for preventing re-energization of said magnet after said main power source voltage falls outside of a voltage range between preset maximum and minimum voltages and means maintaining said magnet energized by said battery means until it has been unloaded under the condition where said magnet was energized by said main power source and said main power source voltages falls out of said range after the magnet has been energized.

2. A battery back-up system for an electric magnet comprising:
   a main power source connected to said magnet through a magnet controller,
   a battery means,
   a unilateral current means connected between said battery means and said magnet such that if the voltage from said main power source drops below the battery voltage power will be supplied from said battery to said magnet,
   including a battery charger and controls connected to said battery, including a current sensing means connected between said battery and said magnet and a first warning device connected to said current sensing means to give a warning when current is supplied to said magnet from said battery, and including a first relay connected to input power terminals of said battery charger and energized when power is connected to said charger, a second relay, first switch contacts connected to said second relay and controlled by said first relay, a fourth switch connected to said magnet controller and controlled by said second relay such that if power is not supplied to said battery charger said magnet cannot be energized if it has not already been energized.

3. A battery back-up system according to claim 2 including a high voltage sensing means connected across said battery and including normally closed second switch contacts which open if the battery voltage exceeds a predetermined limit, and said switch contacts connected to said second relay such that it is de-energized if the battery voltage exceeds said predetermined limit.

4. A battery back-up system according to claim 3 including a low voltage sensor connected across said battery and including normally closed third switch contacts which open if the battery voltage falls below a preset level and said third switch contacts connected to said second relay to de-energize it if the battery voltage falls below said preset level.

5. A battery back-up system according to claim 4 including a second warning device connected across said battery and controlled by said second relay such that it is energized when said second relay is de-energized.

6. A battery back-up system according to claim 5 wherein a said battery charger and controls include a silicon controlled rectifier connected between said charger and said battery, voltage sensing means connected to sense the battery voltage, current sensing means connected to sense current supplied to said charger and said battery, a control circuit connected to said voltage and current sensing means and to the gate of said silicon controlled rectifier to turn it on to supply power to said battery.

7. A battery back-up system according to claim 6 including a rectifier in said battery charger and said silicon controlled rectifier connected between said rectifier and said battery.

* * * * *